(12) United States Patent
Maas et al.

(10) Patent No.: US 8,960,397 B2
(45) Date of Patent: Feb. 24, 2015

(54) APPARATUS FOR TRANSMITTING TORQUE

(75) Inventors: Jürgen Maas, Detmold (DE); Dirk Güth, Paderborn (DE); Martin Aust, Büren (DE)

(73) Assignee: Hochschule Ostwestfalen-Lippe, Lemgo (DE)

( * ) Notice: Subject to any disclaimer, the term of this patent is extended or adjusted under 35 U.S.C. 154(b) by 463 days.

(21) Appl. No.: 13/254,147

(22) PCT Filed: Mar. 2, 2010

(86) PCT No.: PCT/DE2010/000230
§ 371 (c)(1),
(2), (4) Date: Nov. 18, 2011

(87) PCT Pub. No.: WO2010/099788
PCT Pub. Date: Sep. 10, 2010

(65) Prior Publication Data
US 2012/0090938 A1     Apr. 19, 2012

(30) Foreign Application Priority Data

Mar. 3, 2009  (DE) .......................... 10 2009 011 096
Jun. 25, 2009 (DE) .......................... 10 2009 030 639

(51) Int. Cl.
*F16D 37/02* (2006.01)
*F16D 37/00* (2006.01)

(52) U.S. Cl.
CPC .......... *F16D 37/02* (2013.01); *F16D 2037/002* (2013.01); *F16D 2037/004* (2013.01)
USPC ..................................... 192/21.5; 192/58.41

(58) Field of Classification Search
USPC ....................... 192/21.5, 58.4, 58.41; 60/326; 188/267.1, 267.2
See application file for complete search history.

(56) References Cited

U.S. PATENT DOCUMENTS

| | | | |
|---|---|---|---|
| 2,673,631 A * | 3/1954 | Gold ............................ | 192/21.5 |
| 2,759,580 A | 8/1956 | Bower | |
| 3,358,798 A * | 12/1967 | Janson ......................... | 192/21.5 |
| 3,415,346 A | 12/1968 | Boeskool et al. | |
| 4,896,754 A * | 1/1990 | Carlson et al. ............... | 192/21.5 |
| 4,957,644 A | 9/1990 | Price et al. | |
| 6,769,745 B2 * | 8/2004 | Mohr et al. ................. | 303/116.4 |
| 7,240,485 B2 | 7/2007 | Namuduri et al. | |
| 2010/0231069 A1 * | 9/2010 | Liao et al. ...................... | 310/77 |

FOREIGN PATENT DOCUMENTS

| | | |
|---|---|---|
| CN | 201166064 | 12/2008 |
| DE | 927 058 | 4/1955 |
| DE | 199 39 356 | 5/2000 |
| EP | 0 940 286 | 9/1999 |
| JP | 2000-065094 | 3/2000 |
| JP | 59 175636 | 9/2010 |

* cited by examiner

*Primary Examiner* — Troy Chambers
*Assistant Examiner* — Ryan Dodd
(74) *Attorney, Agent, or Firm* — Cozen O'Connor

(57) ABSTRACT

A device for transmission and/or generation of torque having a driveshaft and having a driven shaft acted upon by field-excited forces of a magnetorheological medium, the driveshaft terminates in a flange in a housing, at least one cylinder is arranged on the flange (7), and the cylinder extends over the driven shaft coaxially while forming a gap which is filled with the magnetorheological medium.

10 Claims, 6 Drawing Sheets

APPARATUS FOR TRANSMITTING TORQUE

CROSS REFERENCE TO RELATED APPLICATIONS

This is a U.S. national stage of application No. PCT/DE2010/000230, filed on 2 Mar. 2010. Priority is claimed on German Application No. 10 2009 011 096.8, filed 3 Mar. 2009 and German Application No. 10 2009 030 639.0, filed 25 Jun. 2009, the contents of which are incorporated here by reference.

BACKGROUND OF THE INVENTION

1. Field of the Invention

The invention is directed to a device for transmission and/or generation of torque having a driveshaft and having a driven shaft acted upon by field-excited forces of a magnetorheological medium.

2. Description of the Related Art

Magnetorheological fluids, often abbreviated MRF, are liquids that react to a magnetic field in a manner comparable to ferrofluids but which, in contrast to the latter, solidify in so doing. Magnetorheological fluids are suspensions of magnetic particles on the order of micrometers which form chains when a magnetic field is applied. This increases the apparent viscosity of the magnetorheological liquids culminating in solidification.

These physical characteristics of magnetorheological fluids make it possible in particular to transmit torque in an adjustable manner by an applied electric fields as is known, e.g., from U.S. Pat. No. 7,240,485 B2.

However, if the compressive forces acting on the magnetorheological fluid are too great, the chains formed in a magnetic field are broken, so that there are limits on the forces that can be transmitted.

SUMMARY OF THE INVENTION

It is an object of one embodiment of the invention to provide a device for transmitting torque in which even comparatively high forces can be transmitted by electric and magnetic field-excited forces in a magnetorheological medium and which can also serve to generate torque, particularly without a slip ring, and, further, is constructed in a mechanically simple manner.

This set of technical problems is solved in a device for transmission and/or generation of torque having a driveshaft and having a driven shaft acted upon by field-excited forces in a magnetorheological medium in that the driveshaft terminates in a flange in a housing, in that at least one cylinder is arranged on the flange, and in that the cylinder extends over the driven shaft coaxially while forming a gap which is filled with the magnetorheological medium.

According to one embodiment of the invention the device can advantageously be used as a motor for generating torque through application of electric fields, but also as a generator to which torque can be applied. Accordingly, the designations driveshaft and driven shaft used throughout the present Application are interchangeable as regards their function depending upon the selected mode of operation.

Another substantial advantage consists in that the effective cylinder surfaces of the gap that is filled with the magnetorheological medium can be comparatively large both axially and radially so that sufficiently high torque can be transmitted even by simple steps such as these.

In particular, the driveshaft and driven shaft in the housing terminate respectively in a round flange of a rotor, in that at least one cylinder is arranged on each flange, and in that the cylinders engage one inside the other coaxially so as to form the gap which is filled with the magnetorheological medium. By this step, a gap is defined in an exact manner. When a relative velocity occurs between the cylinders, there is a shearing of the magnetorheological liquid between the cylinder surfaces, which is adjustable through the occurring change in viscosity when a suitable electromagnetic field is applied.

When a rotating field is applied, torque can be provided at both the driveshaft and driven shaft.

For generating an electromagnetic field to be applied, it is further provided that a core that faces into the housing interior and is penetrated by the driveshaft is formed by the housing. In a further constructional embodiment, this core carries a field generator. This step allows the device according to on embodiment of the invention to be constructed without a slip ring, since the field generator can easily be electrically connected through the housing of the device.

This core having the field generator in particular is overlapped by the cylinders that ensures that the gap filled with the magnetorheological medium is optimally situated within the range of influence of the magnetic field of the field generator.

Further constructional steps consist in that an inner air gap is arranged between the inner field generator and a radially inner cylinder of the rotor of the driveshaft and/or in that an outer air gap is arranged between a radially outer cylinder of the rotor of the driven shaft and the housing.

Accordingly, a coupling of the rotor of the driveshaft with the rotor of the driven shaft is carried out exclusively by the gap between the two cylinders of the rotors filled with a magnetorheological medium.

Apart from the simple geometric enlargement of the effective gap surfaces by axial extension or enlargement of the radii, the effective gap surface can be increased in that each flange has a plurality of coaxially arranged cylinders, and in that the cylinders engage one inside the other while forming a plurality of gaps filled with the magnetorheological medium.

This advantageously results in a construction that has, in an axial longitudinal section from the inner side to the outer side, an inner air gap between the core and/or a field generator and a radially inner cylinder of the rotor of the driven shaft, then has a gap filled with magnetorheological medium between the radially inner cylinder of the rotor of the driven shaft and a radially inner cylinder of the rotor of the driveshaft, followed by a gap, again filled with a magnetorheological medium, between the radially inner cylinder of the rotor of the driveshaft and a radially outer cylinder of the rotor of the driven shaft, and directly up to an outer air gap between a radially outer cylinder of the rotor of the driven shaft and a housing.

In this regard, the gaps advisably communicate with one another so as to allow an unobstructed passage of the magnetorheological medium.

To this end, it is provided in a structural embodiment that a radially inner cylinder of the rotor of the driven shaft has, at its side opposite the flange, an annular disk on which cylinders are arranged so as to be open-ended in opposite directions, which cylinders then engage in annular gaps between the cylinders arranged on the flange of the rotor of the driveshaft.

Particularly in the case of gaps that are cascaded and are in an S-shape in axial longitudinal section and which are filled with the magnetorheological medium, it can be expedient to provide a field generator which outwardly surrounds the cylinders coaxially.

When an inner field generator and an outer field generator are provided and, further, when a gap filled with the magnetorheological medium is provided between the outer field generator and a radially outwardly arranged cylinder of the rotor of the driveshaft, radially inner gaps can be used, e.g., for purposes of coupling and outer gaps can be used for braking when magnetic fields are applied correspondingly.

In an alternative constructional variant of the device according to one embodiment of the invention, it is provided that the driven shaft has a core carrying a field generator. In a field generator of this type, induced current can generate magnetic fields, or a field generator of this kind can be supplied with electrical power by slip rings if necessary.

However, it is preferable that an axially extending housing segment covering the core and field generator is electrically insulated, that the magnetorheological medium is electrically conductive and makes electrical contact with the housing segment, and that the magnetorheological medium is electrically insulated from the rest of the housing, the driven shaft, and the driveshaft by a flange in each instance. An electrically nonconductive material of low magnetic permeability is advisably used for the insulation.

In one embodiment, a rotor with cylinders can be omitted in the driven shaft when gaps filled with the electrically conductive magnetorheological medium are provided between the field generator on the driven shaft and a cylinder of a rotor of the driveshaft and between the conducting housing segment and the cylinder.

The construction of the field generator, or field generators, is specifically determined by the use thereof. If torque is to be generated, a winding of this type will substantially correspond to the conventional rotor windings of an electric motor. However, a field generator will preferably have a plurality of winding assemblies that can extend axially and/or radially. Further, an axially alternating field orientation is provided in radially circumferential winding assemblies; cores can be constructed in the usual fashion, e.g., laminated or solid.

Notwithstanding the construction of the core, it can further be provided that field generators are constructed from a material having magnetic hysteresis, e.g., a core made from a ferromagnetic alloy having such hysteresis. Due to this step, a holding torque can also be generated without an electric field being applied, i.e., without current.

For further optimization, it can be provided that a rotor and/or a cylinder are/is fashioned at least in part from a magnetically anisotropic material. When suitably employed and arranged, such anisotropic magnetic materials can direct the magnetic flux in a preferred orientation so as to increase the usable amount of magnetic flux density with the same energy being supplied to the field generator.

It can further be provided in case of axially extending winding assemblies of a field generator that at least one cylinder surface is provided with axially extending grooves or in case of radially extending winding assemblies of a field generator that at least one cylinder surface is provided with radially circumferential grooves. In this regard, the grooves can be arranged in a radially outer cylinder surface or in a cylinder surface located opposite a winding.

In an additional or alternative step, at least one adjacent cylinder is provided with an axially extending sequence of openings in case of axially extending winding assemblies of a field generator, or at least one adjacent cylinder is provided with a radially circumferential sequence of openings in case of radially extending winding assemblies of a field generator.

Irrespective of their orientation, these grooves and/or openings can be filled with a material of low permeability.

BRIEF DESCRIPTION OF THE DRAWINGS

The invention will be described more fully with reference to the drawings in which embodiment examples are only shown schematically. The drawings show.

DETAILED DESCRIPTION OF THE PREFERRED EMBODIMENTS

Figure 1:
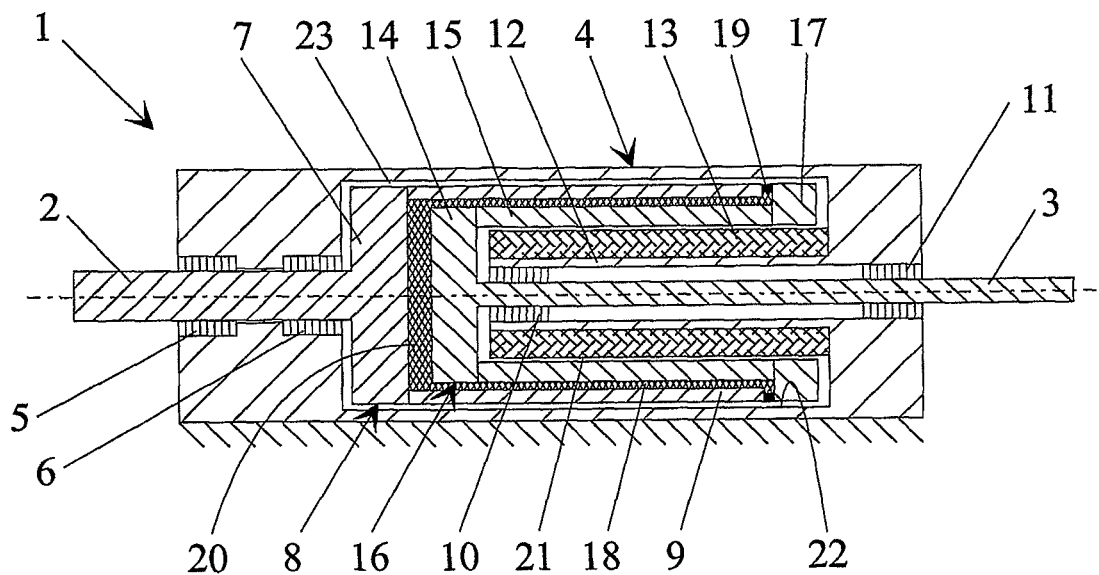
FIG. 1 is a device according to the invention serving as a coupling and drive and having a field generator in axial longitudinal section.

FIG. 1 shows an axial longitudinal section through a device 1 according to one embodiment of the invention which serves to transmit torque from a driveshaft 2 to a driven shaft 3 and that can also generate torque. The driveshaft 2 is captive in a housing 4, e.g., of aluminum, so as to be rotatable in bearings 5, 6 which are only suggested in the drawings and forms a flange 7 of a rotor 8 inside the housing 4. A cylinder 9 made of steel, possibly of an anisotropic material, is fitted to this flange 7 and extends over the driven shaft 3.

The driven shaft 3 is also captive in an opening in the housing 4 so as to be rotatable in two bearings 10, 11. The driven shaft 3 penetrates a core 12 formed by the housing 4 and which carries a field generator 13 on the radially outer side. A flange 14 made, e.g., from aluminum and which carries a cylinder 15 which is likewise made of steel, possibly of an anisotropic material, is likewise formed by the driven shaft 3 in the interior of the housing coaxially inside the cylinder 9 of the rotor 8 of the driveshaft 2.

At the end of the cylinder 15 opposite the flange 14, the rotor 16 of the driven shaft 3 has an annular disk 17 which faces radially outward, covers a gap 18 remaining between the cylinders 9, 15, and terminates by a seal 19, for example, in the manner of the known radial shaft seal, against the cylinder 15.

The gap 18 between the cylinders 9, 15 and the space 20 between the flanges 7, 15 is filled with a magnetorheological medium, preferably a carbonyl iron powder having a particle diameter of several micrometers in an oil-based carrier liquid.

The magnetic field, which changes the flow resistance of the magnetorheological medium and which therefore allows an adjustable torque transmission between the driveshaft 2 and the driven shaft 3, is generated by the field generator 13 that is fixed with respect to the housing and is arranged on the solid or laminated core 12. As a result of this structural step, slip rings for supplying power to the field generator 13 can be dispensed with.

According to FIG. 1, the magnetorheological medium is located exclusively in gap 18 and space 20. An air gap 21 remains between the inner field generator 13 and the cylinder 15 of the rotor 16 of the driven shaft 3, and an air gap 23 remains between the inner side 22 of the housing and the cylinder 9 of the rotor 8 of the driveshaft 2.

In addition to the controllable torque transmission, the device 1 can be used for the generation of torque in the manner of an electric motor. For this purpose, a rotational field must be generated by the field generator 13 so that torque is available on the drive side and on the driven side, and the coupling function is retained. Accordingly, the drive-side torque can be conveyed at an increased magnitude to the driven side in a switchable manner, as it were. Conversely, it is possible to generate a braking torque by operating the field generator 13 in generator mode.

Figure 2:
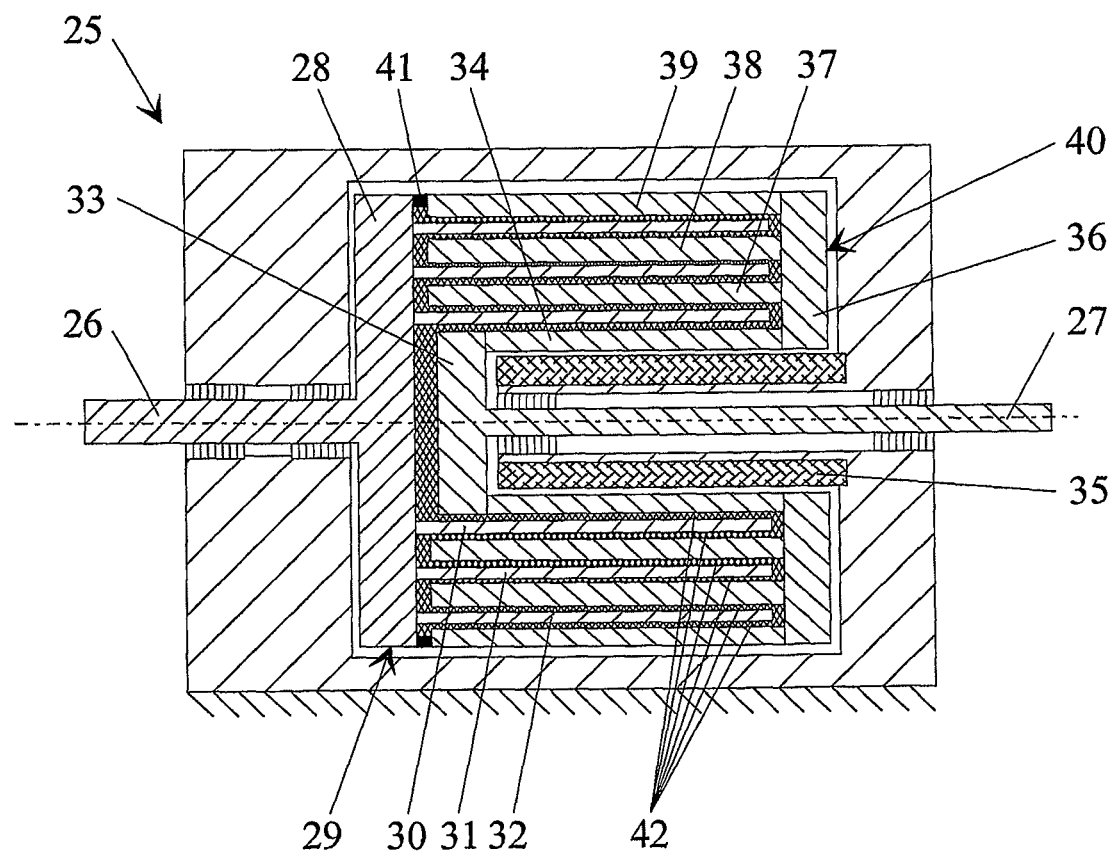
FIG. 2 is a cascaded construction.

The device 25 according to FIG. 2 also serves to couple and/or drive a driveshaft 26 and a driven shaft 27. The flange 28 of the rotor 29 of the driveshaft 26 carries three coaxially arranged cylinders 30, 31, and 32; the flange 28 protrudes radially beyond the outer cylinder 32.

The flange 33 of the driven shaft 27 carries a cylinder 34, which covers an inner field generator 35, fixed with respect to the housing. On the side located opposite the flange 33, the cylinder 34 has an annular disk 36 on which three cylinders 37, 38, and 39 are arranged coaxially in such that the two radially inner cylinders 37, 38 extend into the annular gaps between the oppositely located cylinders 30 to 32 of the rotor 29 of the driveshaft 26. The radially outer cylinder 39 of the rotor 40 of the driven shaft 27 terminates against the flange 28 of the rotor 29 of the driveshaft 26 with a seal 41. This step provides six effective gaps 42 which are filled with a magnetorheological medium.

Since the free ends of the cylinders 30 to 32 of the rotor 29 are at a distance axially from the annular disk 36 of the rotor 40 of the driven shaft 27, these gaps 42 communicate with one another.

Torque to be transmitted can be increased in magnitude many times over by this cascaded action of a plurality of gaps 42.

Figure 3:
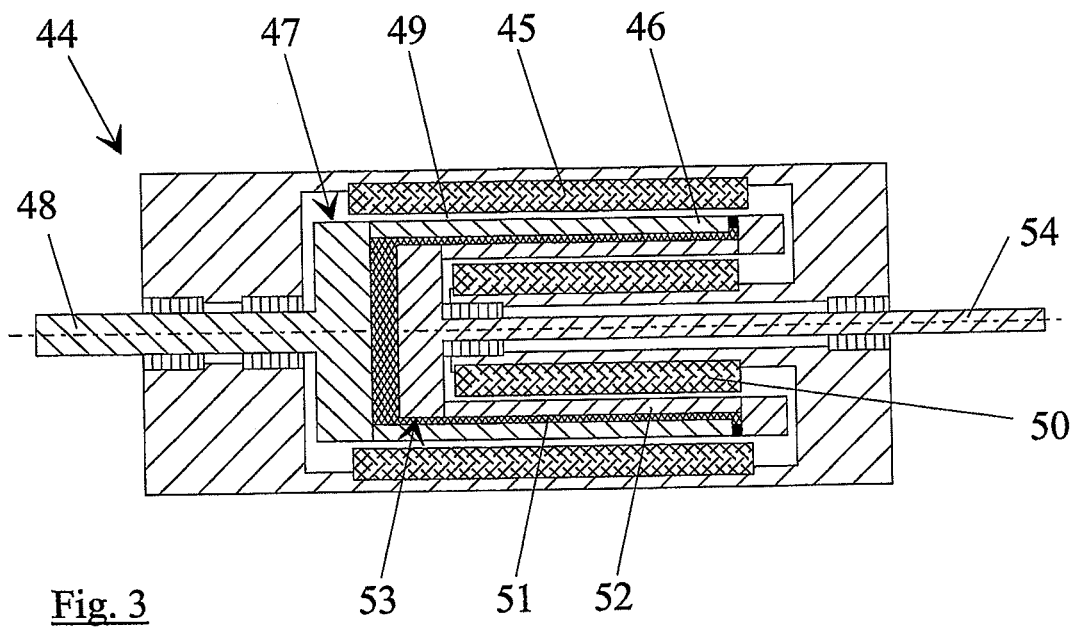
FIG. 3 is an embodiment having two field generators.

In the embodiment example of a device 44 according to FIG. 3, the efficiency of the torque transmission or torque generation is increased by a second, outer field generator 45. A free air gap 49 remains between this outer field generator 45 and a radially outer cylinder 46 of the rotor 47 of a driveshaft 48. With the same orientation of the magnetic fields of an inner field generator 50 and of the outer field generator 45, the magnetically active field is substantially increased by the gap 51 filled with a magnetorheological medium between cylinder 46 and cylinder 52 of a rotor 53 of a driven shaft 54, which means an increase in the torque that can be transmitted.

Figure 4:
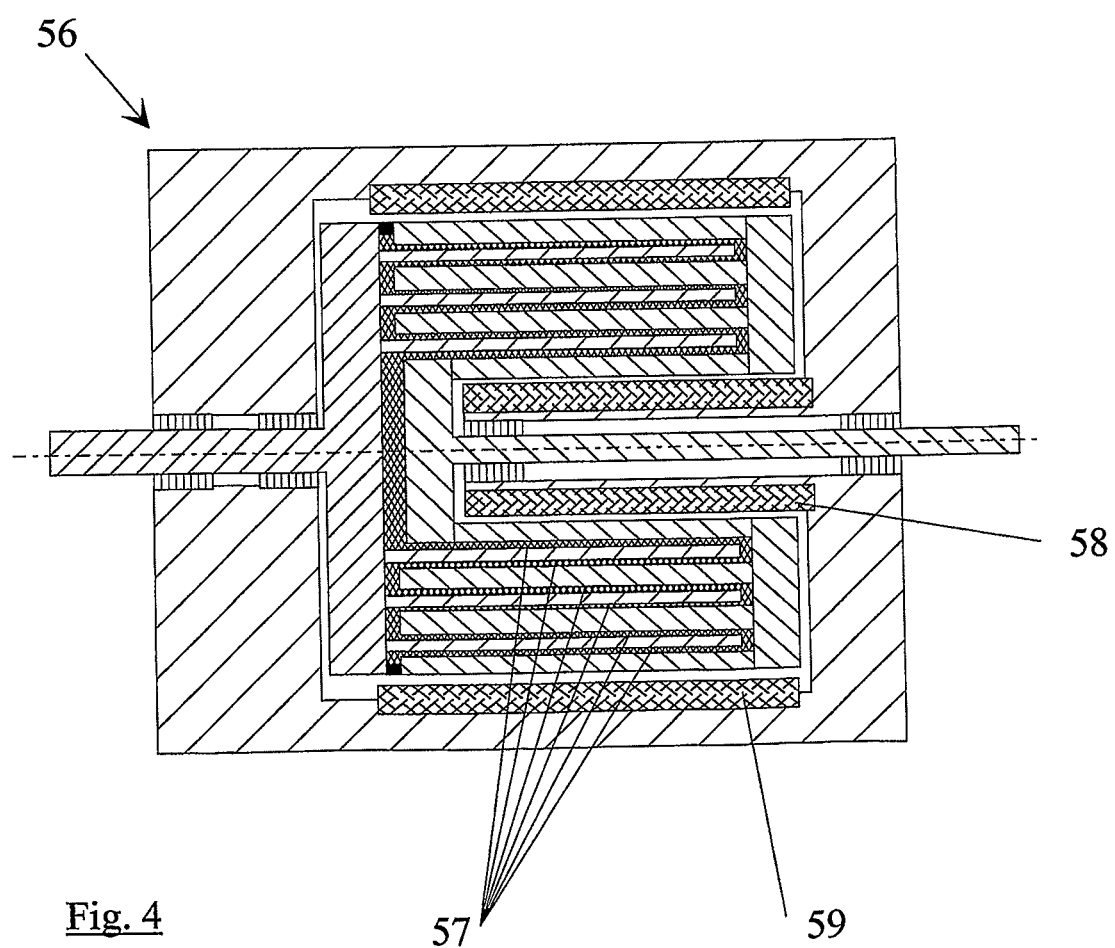
FIG. 4 is a cascaded embodiment form.

In the embodiment example of the device 56 according to FIG. 4, with cascaded gaps 57, an inner field generator 58 and an outer field generator 59 can have the same intensifying field orientations so that in addition to the increased torque transmission by the cascading of gaps 57, the torque to be transmitted is also further increased by an increase in the magnetic field strength.

Figure 5:
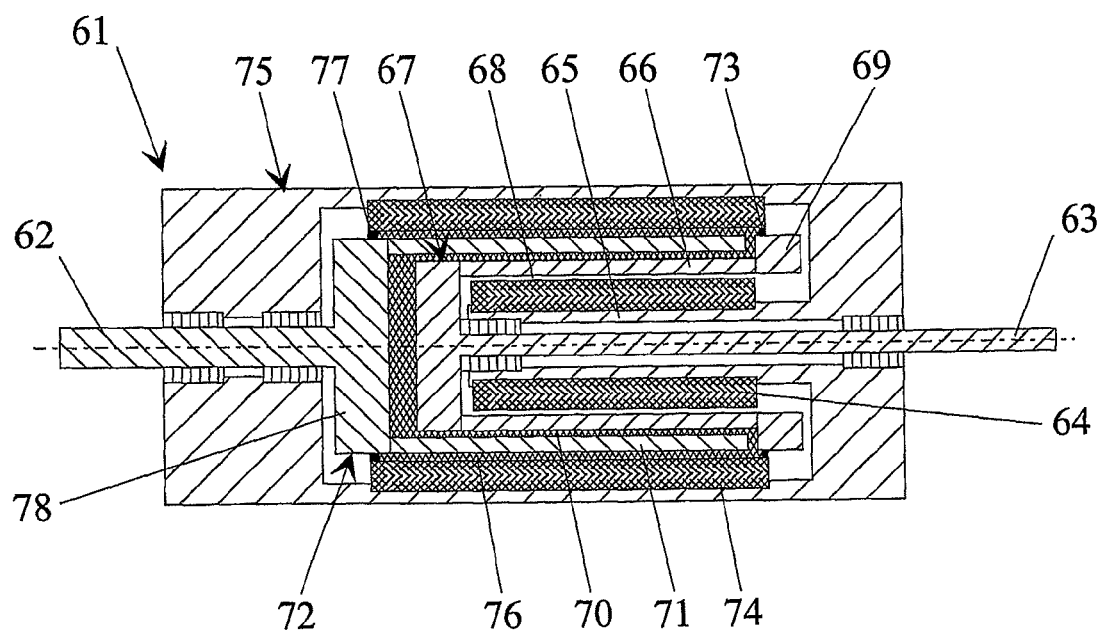
FIG. 5 is a device serving as coupling, brake and drive.

The device 61 according to FIG. 5 is used for coupling a driveshaft 62 and a driven shaft 63, braking, and driving. To this end, an inner field generator 64 is again provided on a core 65 fixed with respect to the housing penetrated by the driven shaft 63. An air gap 68 is located between the inner field generator 64 and a cylinder 66 of a rotor 67 of the driven shaft 63. An annular disk 69 covers a gap 70 between the cylinder 66 of the rotor 67 of the driven shaft 63 and a cylinder 71 of a rotor 72 of the driveshaft 62. In this embodiment example, sealing 73 of the annular disk 69 is carried out relative to an outer field generator 74, possible relative to the housing 75. This allows a gap 76 between the outer field generator 74 and the radially outer cylinder 71 of the rotor 72 of the driveshaft 62 also to be filled with a magnetorheological medium. This gap 76 is then sealed by another seal 77 between a flange 78 of the rotor 72 and the outer field generator 74, possibly relative to the housing 75.

This provides two effective gaps 70, 76, of which the radially inner gap 70 serves for the transmission of torque and, accordingly, for coupling, while the radially outer gap 76 is used for a braking action. The variable flow resistance between the rotor 72 of the driveshaft 62 and the housing 75 or field generator 74 is used for the braking action. In so doing, on the one hand, both identically oriented and oppositely oriented magnetic fields of the inner field generator 64 and outer field generator 74 can extend over the two gaps 70, 76 so that the field of the outer field generator 74 is adjusted for a coupling function such that the action of its field opposes that of the inner field generator 64 in the radially outer gap 76.

Figure 6:
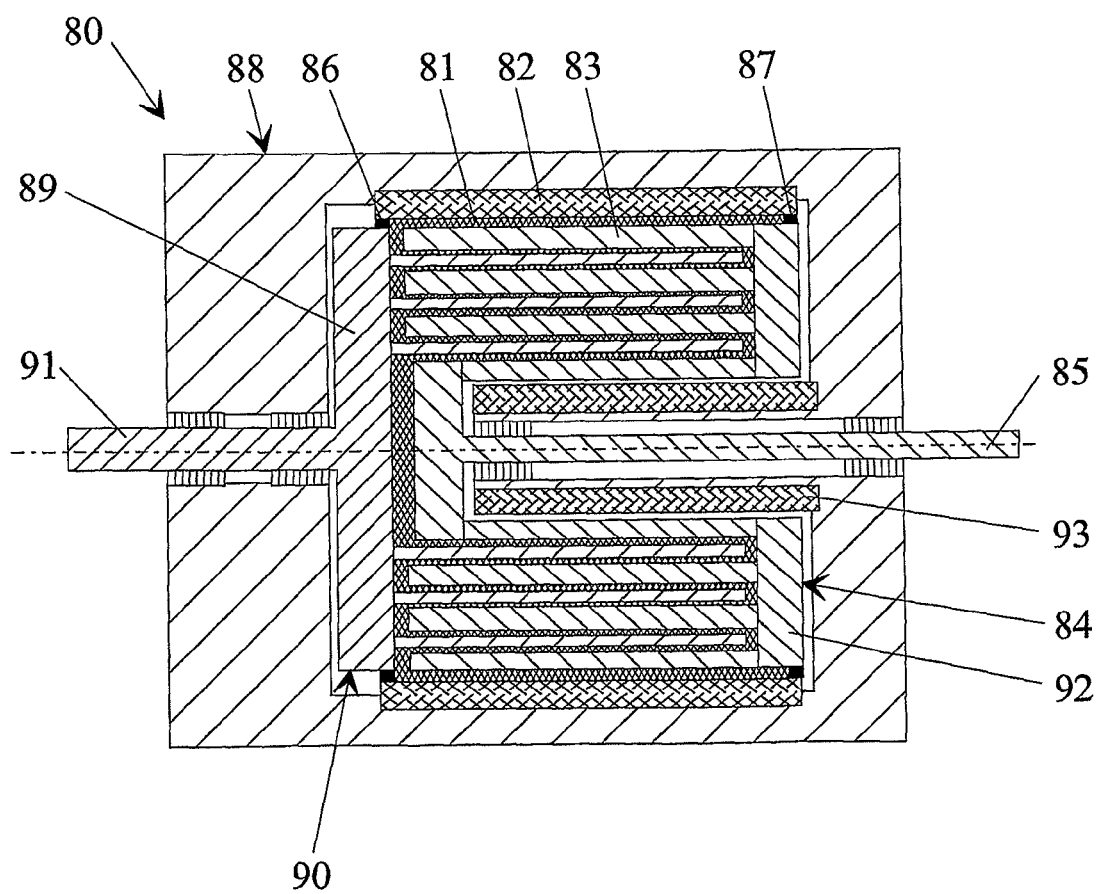
FIG. 6 is a cascaded embodiment form.

This also holds true in a comparable manner for the device 80 according to FIG. 6 in which, in a cascaded arrangement of gaps, a radially outer gap 81 between an outer field generator 82 and a radially outer cylinder 83 of a rotor 84 of a driven shaft 85 is filled with a magnetorheological medium. A sealing of this radially outer gap 81 which is used for a braking action is carried out by seals 86, 87 between the outer field generator 82, possibly the housing 88, and the flange 89 of the rotor 90 of the driveshaft 91 and an annular disk 92 of the rotor 84 of the driven shaft 85.

In this embodiment example also, the orientation of the magnetic fields generated by the outer field generator 82 and an inner field generator 93 can be identical or opposed.

Figure 7:
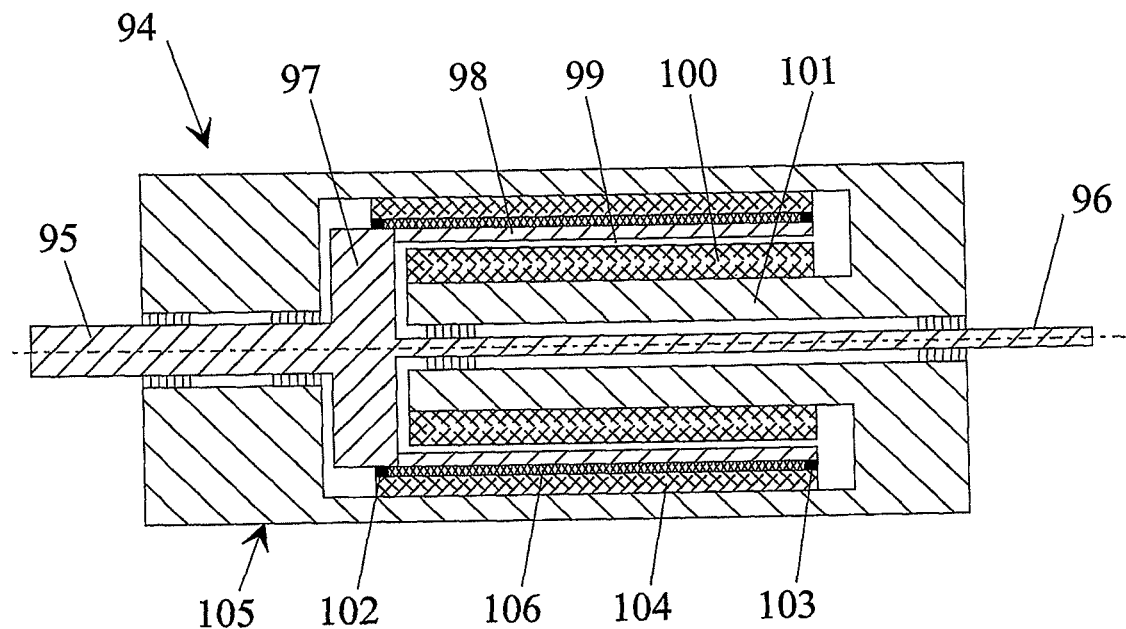
FIG. 7 is a variant of the invention according to the invention.

The device 94 according to FIG. 7 is characterized by a rigid coupling between a driveshaft 95 and a driven shaft 96. Consequently, this device 94 can only be used for braking or driving. To this end, a flange 97 carries a cylinder 98 that extends over an inner field generator 100 on a core 101 fixed with respect to the housing with a driven shaft 96 supported therein, while leaving an air gap 99. On the radially outer side, seals 102, 103 are provided at the free end of the cylinder 98 and on the flange side to seal against an outer field generator 104, possibly a housing 105, and the gap 106 formed in this way is filled with a magnetorheological medium.

In one embodiment, the inner field generator 100 serves to develop torque in the air gap 99, and the outer field generator 104 can then act in opposition to the magnetic flux of the inner field generator 100 via the gap 106. This is not necessary when the wall thickness of the cylinder 98 is adequately dimensioned. In case of braking, the two field generators 100, 104 can be used in combination to build up torque.

Figure 8:
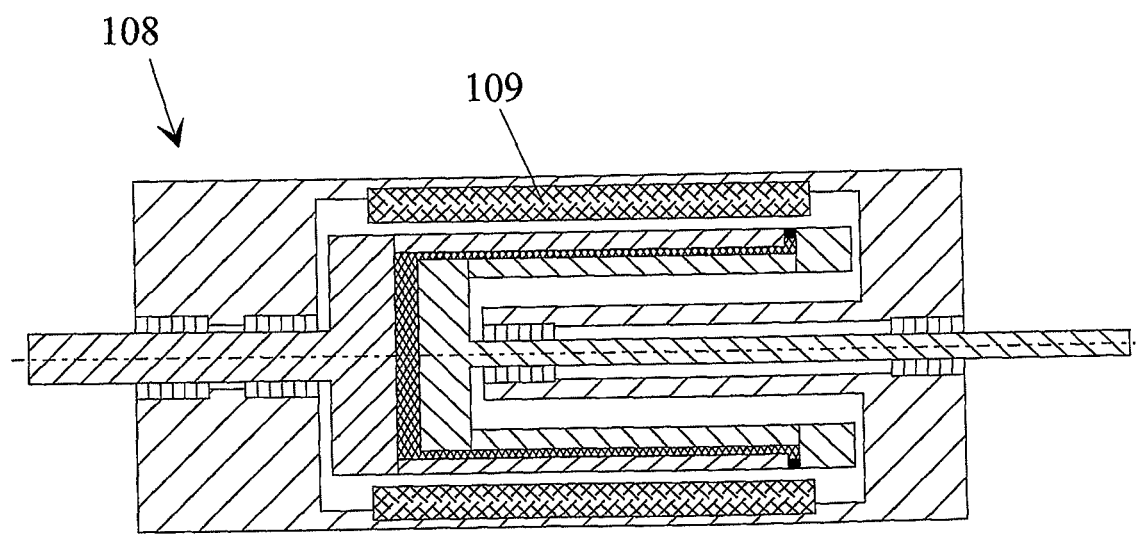
FIG. 8 is a device which serves as a coupling and drive and which has only one outer field generator.

In the embodiment example of the device 108 according to FIG. 8, an outer field generator 109 is provided. In other respects, the device 108 serving for coupling and driving corresponds to that shown in FIG. 1.

Figure 9:
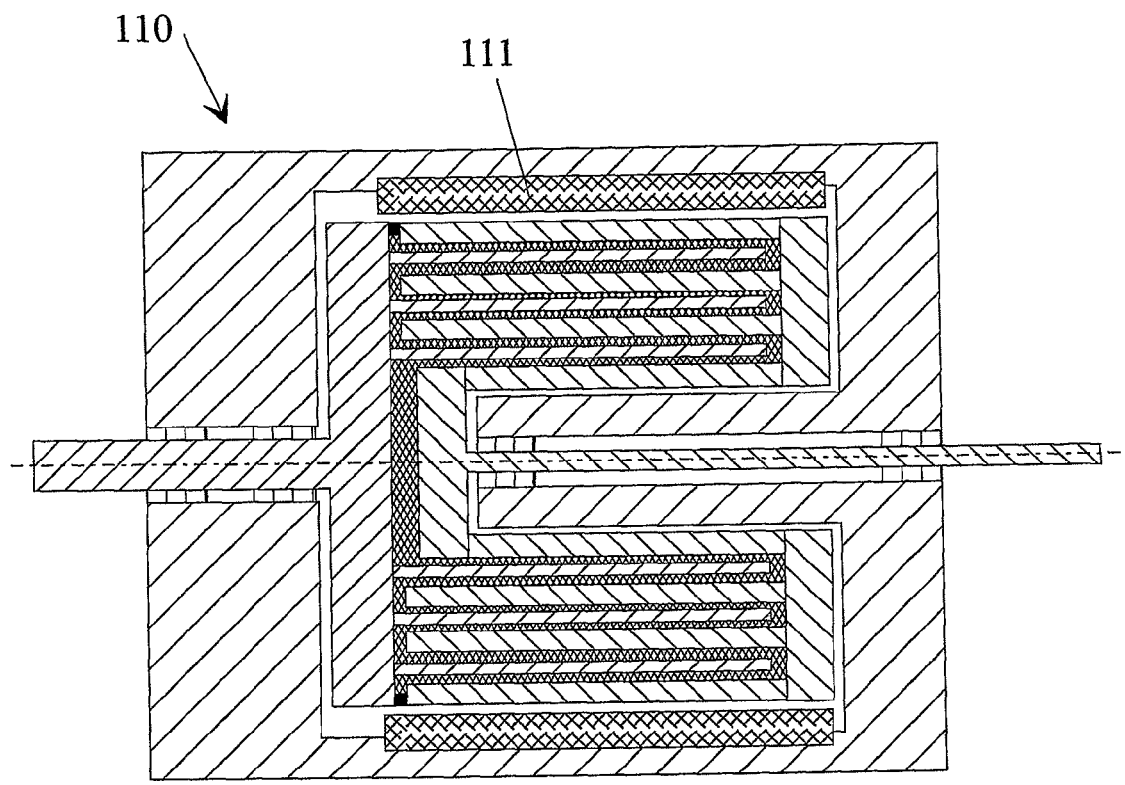
FIG. 9 is a cascaded embodiment form.

The device 110 according to FIG. 9 likewise corresponds to that described with reference to FIG. 2, but an outer field generator 111 is also provided in device 110.

Figure 10:
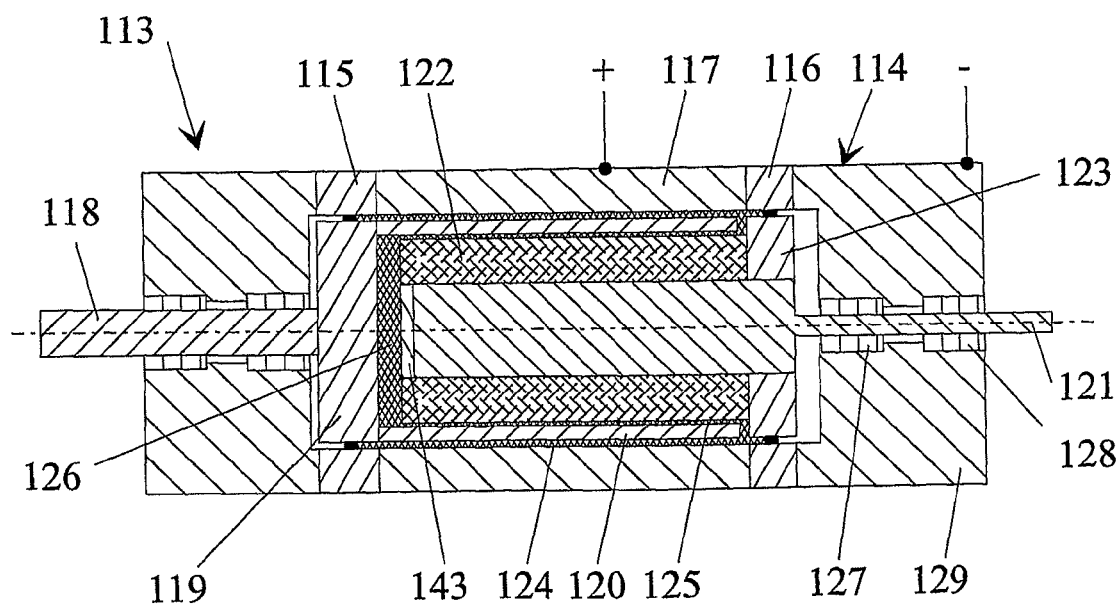
FIG. 10 is a coupling with a field generator on the driven shaft.

FIG. 10 shows another variant of a device 113 according to one embodiment of the invention. Housing 114 is divided axially by two insulations 115, 116, preferably of a material having low permeability, so as to form a middle housing segment 117. A driveshaft 118 is also provided with a non-conducting flange 119 that carries a cylinder 120 made of an electrically conductive material, for example, steel.

The driven shaft 121 of the device 113 carries a field generator 122, a flange 143, and an annular disk 123 made of an electrically non-conducting material which, again, has low permeability. The flange 119 as well as the annular disk 123 are sealed relative to the insulations 115, 116. Because of the axial distance between the free end of the cylinder 120 and the annular disk 122, two gaps 124, 125 are formed which, like space 126, are continuously filled with a magnetorheological medium.

This magnetorheological medium is electrically conductive so that a current supply, indicated by +/−, is carried out via the middle, conductive housing segment 117 and the electrically conductive magnetorheological medium, and the driven shaft 121, its bearings 127, 128, and the housing part 129.

Accordingly, it is ensured in this device 113 that the field generator 122 rotating along with the driven shaft 121 is also supplied with current without slip rings.

In all of the embodiment examples, the cylinders can be made of a steel, possibly a different material, e.g., an anisotropic material, as a simple hollow cylinder with smooth surfaces. Grooves or slots can also be incorporated which can exert a specific fluid-mechanical influence in the gaps and can also allow the magnetic flux to be managed in a specific manner. Special anisotropic magnetic materials can also direct the magnetic flux in a preferred direction so that the usable amount of magnetic flux density is increased with the same supply of energy to the field generator.

The construction of the field generators can be carried out substantially conventionally. Accordingly, winding assemblies can be arranged on a solid core or a laminated core, and known materials can be used. When special magnetic alloys having remanent magnetic properties, a controllable residual magnetism, are used, the field generator can have a magnetized or non-magnetized state as selected. Coupling torque and braking torque can then also be applied in case there is no energy supply, and the magnetization can be deliberately changed by the field generator itself.

Figure 11:
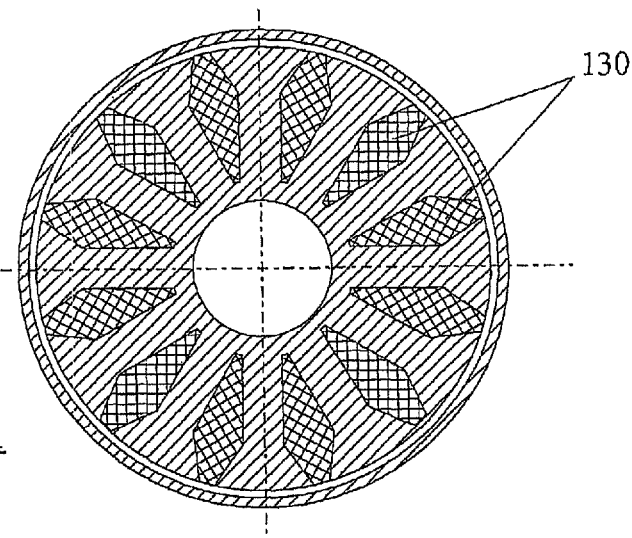
FIG. 11 is a radial section through a field generator.

If a device according to the invention is intended for a drive, a field generator with axially extending windings 130 (see FIG. 11) is used; its windings 130 substantially correspond to those of a rotor of a conventional electric motor.

Radially wound winding assemblies are shown schematically in FIGS. 12 to 15. If they are individual coils, the winding assemblies 131, 132; 133, 134 can be operated directly in parallel circuits with an inner field generator according to FIG. 12 and with an outer field generator according to FIG. 13, wherein an axially alternating field orientation is achieved by means of the alternating winding direction of the winding assemblies 131, 132 and 133, 134, respectively.

Figures 12, 14:
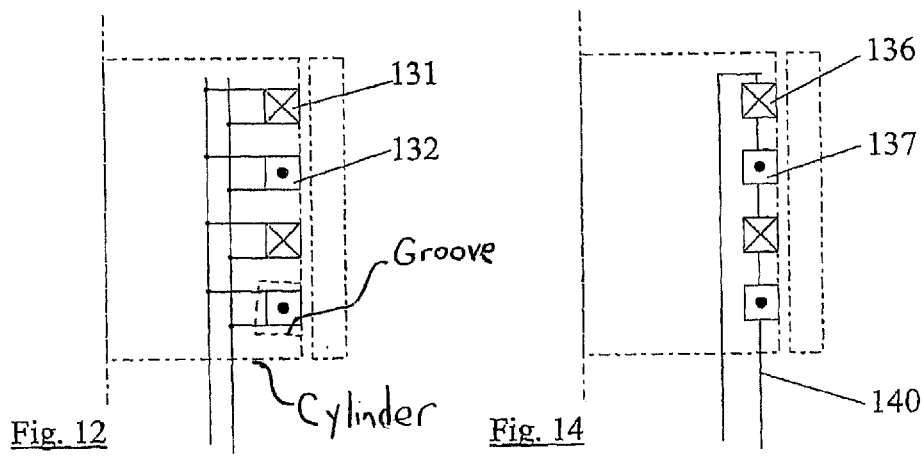
FIG. 12 is the parallel circuit of an inner field generator.
FIG. 14 is a series circuit of an inner field generator.
Figures 13, 15:
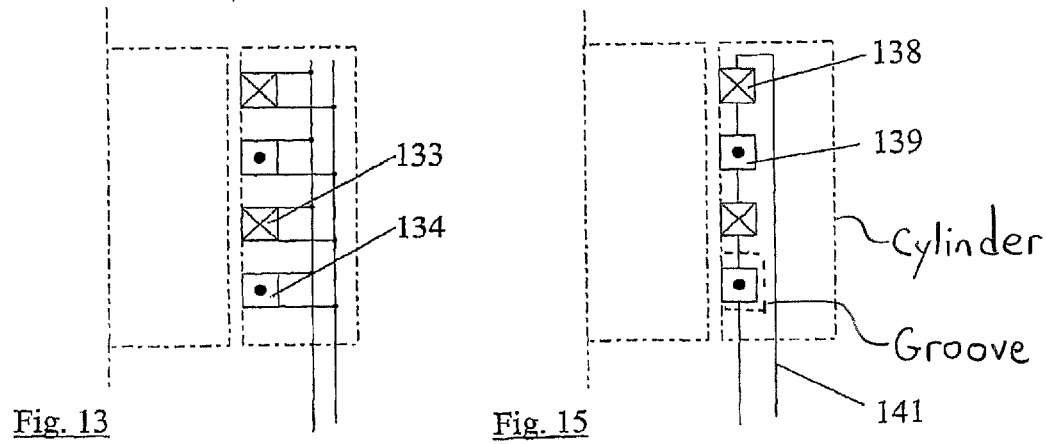
FIG. 13 is a parallel circuit of an outer field generator.
FIG. 15 is a series circuit of an outer field generator.

FIG. 14 shows winding assemblies 136, 137 with an inner field generator, and FIG. 15 shows winding assemblies 138, 139 with an outer field generator in which, respectively, a continuous winding wire 140, 141 has an alternating winding direction axially so that a series connection of oppositely oriented winding assemblies 136, 137 and 138, 139, respectively, is formed.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A Device for at least one of transmission and generation of torque comprising:
   a housing;
   a magnetorheological medium;
   a driveshaft having a driven shaft oppositely arranged such that the driven shaft penetrates walls of the housing and which is acted upon by field-excited forces of the magnetorheological medium in a gap dividing the shafts;
   at least one field generator coaxial to the gap configured to generate the field-excited forces;
   a core that faces into an interior of the housing that is penetrated by the driven shaft is formed by the housing;
   a respective flange in which each of the driveshaft and the driven shaft terminate;
   a first cylinder which is arranged on the flange of the driven shaft, wherein the first cylinder overlaps the driven shaft and the core coaxially while partially forming an air gap with a round cross section along its axial extension, and
   a second cylinder with a round cross section along its axial extension which is arranged on the flange of the driveshaft, and the second cylinder overlaps first cylinder coaxially while forming the gap that is filled with the magnetorheological medium.

2. The device according to claim 1, wherein the core carries a field generator.

3. Device according to claim 2, wherein the air gap comprises:
   an inner air gap is provided between the field generator and the first cylinder.

4. The device according to claim 1, wherein each respective flange has a plurality of coaxially arranged cylinders, and the plurality of coaxially arranged cylinders are arranged one inside the other while forming a plurality of gaps filled with the magnetorheological medium.

5. The device according to claim 1, wherein the cylinders are surrounded coaxially by an outer field generator.

6. The device according to claim 5, wherein a gap between the outer field generator and a radially outwardly arranged cylinder is filled with the magnetorheological medium.

7. The device according to claim 1, wherein the field generator comprises a plurality of winding assemblies that extend one of axially and radially.

8. The device according to claim 7, wherein radially circumferential winding assemblies have axially alternating field orientations.

9. The device according to claim 1, wherein the field generators are constructed from a material having magnetic hysteresis.

10. The device according to claim 1, wherein at least one of a rotor, the first cylinder, and the second cylinder are formed at least in part from a magnetically anisotropic material.

* * * * *